A. G. KUHN.
AUTOMOBILE TIRE.
APPLICATION FILED AUG. 1, 1919.
1,401,610. Patented Dec. 27, 1921.
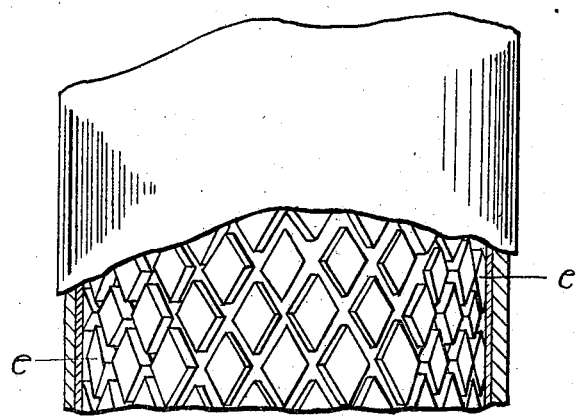
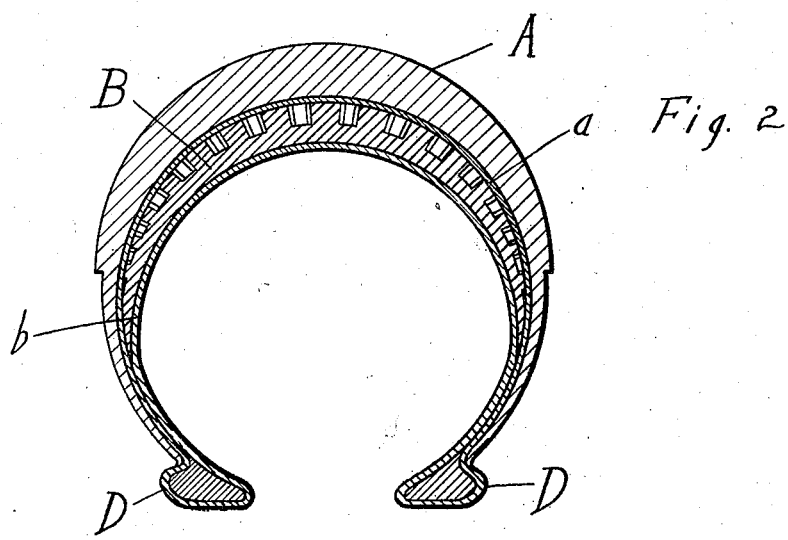

UNITED STATES PATENT OFFICE.

ARTHUR G. KUHN, OF COVINGTON, KENTUCKY.

AUTOMOBILE-TIRE.

1,401,610. Specification of Letters Patent. Patented Dec. 27, 1921.

Application filed August 1, 1919. Serial No. 314,691.

*To all whom it may concern:*

Be it known that I, ARTHUR G. KUHN, a citizen of the United States of America, and a resident of Covington, in the county of Kenton and State of Kentucky, have invented a new and useful Improvement in Automobile-Tires, of which the following is a specification.

The object of my invention is to increase the thickness of an automobile tire without increasing the weight thereof in an objectionable degree.

Another object of my invention is to provide an automobile tire which has a double casing and in which the surface of the inner casing affords a uniform bearing surface for the outer casing.

Another object of my invention is to provide an automobile tire, the casing of which has an increased resiliency.

These and other objects are attained by the means described in the specification and illustrated in the accompanying drawings, in which:—

Figure 1, is a plan view of a portion of an automobile tire embodying my invention with part of the outer casing removed.

Fig. 2, is a sectional view of the same.

The tire embodying my invention comprises an outer casing A and an inner casing B in both of which the portion adjacent to the tread of the wheel is of increased thickness and gradually diminishes toward the beads D. The fabric lining *a* of the outer casing, and *b* of the inner casing, merge in the bead portion D. Upon the outer surface of the inner casing B there are a series of transverse rows *e* of diamond shaped projections. The projections in a row are staggered to the projections in the adjacent rows, and the rows are placed at a distance apart less than the length of the diamond shaped projections, so that there are a series of diagonal channels left between the diamond shaped figures.

Since the diamond shaped figures are staggered and the apexes of one set of projections occupy the spaces between the diamond shaped ends of adjacent projections, the projections afford a practically uniform surface for contacting with the inner face of the outer casing A. The air space left between the projections lessens the weight of the tire and likewise gives a greater resiliency thereto.

Having thus described my invention, what I claim is:—

1. An automobile tire comprising an outer casing and an inner casing integral therewith, the inner casing having on its outer surface a series of rows of diamond shaped projections, the projections in adjacent rows being staggered, and the rows being a distance apart less than the length of the projections.

2. In an automobile tire the combination with an outer casing comprising a fabric lining and a tread mounted on the lining, of an inner casing integral with the outer casing and comprising a fabric and a tread on the second mentioned lining having formed on its outer surface a series of rows of diamond shaped projections in adjacent rows engaging and supporting the first mentioned lining, the projections in adjacent rows being staggered, and the rows being a distance apart less than the width of the projections.

3. An automobile tire comprising a continuous tubular lining, developed into an outer portion and an inner portion substantially eccentric to one another, beads formed adjacent the point of divergence of the inner and outer portions, an outer tread formed on the outer surface of the outer portion, and an inner tread formed between the inner and outer lining portions having formed upon it a series of rows of diamond shaped projections engaging the outer lining portion, the projections in adjacent rows being staggered, and the rows being a distance apart less than the length of the projections, the second mentioned tread substantially filling the space between the inner and outer lining portions.

In testimony whereof, I have hereunto subscribed my name this 30th day of July, 1919.

ARTHUR G. KUHN.